(12) United States Patent
Martines

(10) Patent No.: US 10,264,076 B2
(45) Date of Patent: Apr. 16, 2019

(54) COMMUNICATION SYSTEM AND METHOD IMPLEMENTING A RECIPIENT FOR A COSMETIC OR PHARMACEUTICAL PRODUCT OR A WINE OR A SPIRIT AND TWO MOBILE TELECOMMUNICATION DEVICES

(71) Applicant: QUALIPAC, Clichy (FR)

(72) Inventor: Gérald Martines, Paris (FR)

(73) Assignee: Qualipac, Clichy (FR)

( * ) Notice: Subject to any disclaimer, the term of this patent is extended or adjusted under 35 U.S.C. 154(b) by 0 days.

(21) Appl. No.: 15/548,361

(22) PCT Filed: Feb. 3, 2016

(86) PCT No.: PCT/FR2016/050226
§ 371 (c)(1),
(2) Date: Aug. 2, 2017

(87) PCT Pub. No.: WO2016/124857
PCT Pub. Date: Aug. 11, 2016

(65) Prior Publication Data
US 2018/0020058 A1    Jan. 18, 2018

(30) Foreign Application Priority Data
Feb. 3, 2015  (FR) ...................... 15 50841

(51) Int. Cl.
*H04W 4/70*    (2018.01)
*H04L 29/08*   (2006.01)
(Continued)

(52) U.S. Cl.
CPC .......... *H04L 67/125* (2013.01); *A45D 34/02* (2013.01); *A61J 1/00* (2013.01); *B65D 85/72* (2013.01);
(Continued)

(58) Field of Classification Search
CPC ....... A48B 15/0006; H04W 4/70; H04L 29/08
(Continued)

(56) References Cited

U.S. PATENT DOCUMENTS

2006/0218014 A1    9/2006  Walker et al.
2009/0291422 A1*  11/2009  Puurunen .......... A46B 15/0006
                                                        434/263
(Continued)

FOREIGN PATENT DOCUMENTS

EP    1 546 819 A2   6/2005
EP    2 571 233 A1   3/2013
(Continued)

OTHER PUBLICATIONS

International Search Report related to Application No. PCT/FR2016/050226 dated Mar. 22, 2016.

*Primary Examiner* — William D Cumming
(74) *Attorney, Agent, or Firm* — Miller, Matthias & Hull LLP

(57) ABSTRACT

The invention concerns the field of communicating objects intended to promote a smart environment. The invention more particularly concerns a communication system comprising: —a recipient 1 for a cosmetic or pharmaceutical product or a wine or a spirit as the communicating object and —at least two mobile telecommunication devices 110, 120. The invention also concerns an associated communication method. The recipient is incorporated into the communication system in such way as to adapt at least to the presence of the first mobile telecommunication device in the coverage area of the communication means of same. The recipient is therefore advantageously an actor of the communication system. The recipient promotes the smart environment defined by the communication system.

7 Claims, 11 Drawing Sheets

(51) Int. Cl.
  *H04W 4/80* (2018.01)
  *F21V 33/00* (2006.01)
  *A45D 34/02* (2006.01)
  *A61J 1/00* (2006.01)
  *B65D 85/72* (2006.01)
  *F21V 23/00* (2015.01)
  *G02B 6/00* (2006.01)
  *A45D 33/32* (2006.01)
  *A45D 34/00* (2006.01)
  *F21V 8/00* (2006.01)
  *H04W 4/02* (2018.01)
  *F21Y 115/10* (2016.01)
  *H04W 4/60* (2018.01)

(52) U.S. Cl.
  CPC ........ *F21V 23/005* (2013.01); *F21V 33/0004* (2013.01); *G02B 6/00* (2013.01); *H04W 4/70* (2018.02); *H04W 4/80* (2018.02); *A45D 33/32* (2013.01); *A45D 34/00* (2013.01); *F21Y 2115/10* (2016.08); *G02B 6/0073* (2013.01); *H04L 67/025* (2013.01); *H04W 4/023* (2013.01); *H04W 4/60* (2018.02)

(58) Field of Classification Search
  USPC .......................................... 455/420; 434/263
  See application file for complete search history.

(56) References Cited

U.S. PATENT DOCUMENTS

| | | | |
|---|---|---|---|
| 2010/0167704 | A1 | 7/2010 | Villemaire |
| 2014/0045147 | A1 | 2/2014 | Mohn et al. |
| 2018/0020058 | A1* | 1/2018 | Martines ................. H04W 4/70 |

FOREIGN PATENT DOCUMENTS

| | | |
|---|---|---|
| FR | 2 962 306 A1 | 1/2012 |
| WO | WO 2004/021965 A2 | 3/2004 |
| WO | WO 2014/016718 A1 | 1/2014 |

\* cited by examiner

COMMUNICATION SYSTEM AND METHOD IMPLEMENTING A RECIPIENT FOR A COSMETIC OR PHARMACEUTICAL PRODUCT OR A WINE OR A SPIRIT AND TWO MOBILE TELECOMMUNICATION DEVICES

CROSS-REFERENCE TO RELATED APPLICATION

This Application is a 35 USC § 371 US National Stage filing of International Application No. PCT/EP2016/050226 filed on Feb. 3, 2016, and claims priority under the Paris Convention to French Patent Application No. 15 50841 filed on Feb. 3, 2015.

FIELD OF THE DISCLOSURE

The invention relates to the field of communicating objects intended to promote an intelligent environment.

The invention relates more particularly to a communication system comprising a container for a cosmetic or pharmaceutical product or a wine or a spirit and at least two mobile telecommunication devices. The invention also relates to a corresponding communication method.

BACKGROUND OF THE DISCLOSURE

There are communicating objects, such as containers of perfume or cosmetics, capable of producing an atmospheric light sequence and arranged to receive commands to vary the produced light sequence over time. The communicating object then operates exclusively as a slave of the communication system.

In addition, there are items associated, individually or as a group, with an RFID chip readable by a mobile telecommunication device so that information can be obtained about the item or group of items in which the chip is read. For example, the traceability of an item or group of items in its distribution channel can advantageously be obtained. However, the communication thus achieved between the item and the mobile telecommunication device is exclusively one-way, from the item or group of items to the mobile telecommunication device.

SUMMARY OF THE DISCLOSURE

In this context, the present invention proposes a system and a communication method involving a communicating object and enabling greater interactivity between their users.

To this end, the system of the invention, comprising a container for a cosmetic or pharmaceutical product or a wine or a spirit and at least two mobile telecommunication devices, is essentially such that:
the container comprises a plurality of electronic components that are operatively interconnected, including:
  at least one source of sensory stimulation, arranged to emit a sensory signal towards the exterior of the container,
  two-way short-range radio communication means, and
  control means for said at least one source of sensory stimulation,
and such that
a first among said at least two mobile telecommunication devices comprises two-way short-range radio communication means,
such that the container and a second among said at least two mobile telecommunication devices are able to communicate with each other via the first mobile telecommunication device, when the first mobile telecommunication device is located within a coverage area of the two-way communication means of the container,
the control means of the container controlling said at least one source of sensory stimulation so as to generate a sequence of sensory signals that is determined at least on the basis of data communicated to the container by the second among said at least two mobile telecommunication devices.

The container is thus integrated into the communication system such that it adapts at least to the presence of the first mobile telecommunication device within its coverage area. The container is therefore advantageously an actor in the communication system. The container promotes the intelligent environment defined by the communication system.

According to one feature, as the container is associated with an identifier, and at least one among said at least two mobile telecommunication devices comprises means for reading this identifier, the container and said mobile telecommunication device may comprise pairing means and data storage media, these means being arranged so that the reading of the container identifier by the reading means of said mobile telecommunication device initiates a pairing between the container and said mobile telecommunication device by their respective pairing means.

In another feature, the first mobile telecommunication device may comprise:
  means for detecting the presence of the container within the coverage area of its short-range communication means, and
  means for automatic connection with the container by using at least the predefined pairing data stored in a storage medium of the first mobile telecommunication device,
  such that, where appropriate, a communication session is opened between the first mobile telecommunication device and the container, via their respective short-range communication means.

In another feature, the communication system may further comprise a remote server with which at least one among said mobile telecommunication devices is able to communicate at least in order to download an application to install, this application being dedicated to defining and storing, at least in a storage medium of the mobile telecommunication device and/or of the remote server, at least one among:
  a personal database, and
  a lookup table mapping between the data communicated to the container and the sequence of sensory signals to generate.

According to another feature, the container may further comprise at least one sensor arranged to detect an event, the sensor being operatively connected to the other electronic components of the container so that detection of the event by the sensor then triggers, when appropriate, the sending of corresponding data by the communication means of the container to the second mobile telecommunication device and/or a remote server.

The container is thus integrated into the communication system so that it reacts at least to detected events.

In another feature, the container may further comprise a timer operatively connected to the other electronic components of the container, in order to ensure the activation or deactivation of said at least one source of sensory stimulation at least on the basis of predefined data stored in a storage medium of the container or of the first mobile telecommunication device.

In another feature, the communication system may further comprise means for the geolocation of one of said mobile telecommunication devices, so that the sequence of sensory signals is generated, when appropriate, at least on the basis of corresponding geolocation data.

The invention also relates to a communication method associated with the communication system described above.

The invention also relates to a computer program comprising instructions for implementing the method as introduced above, when said instructions are distributed across various storage media of the communication system as described above and executed by various processors of said communication system.

BRIEF DESCRIPTION OF THE DRAWINGS

Other features and advantages of the invention will become apparent from the following description which is given for indicative purposes only and is in no way limiting, with reference to the accompanying drawings in which.

DETAILED DESCRIPTION OF THE DISCLOSURE

In the various figures, the same references designate identical or similar elements.

Figure 8:
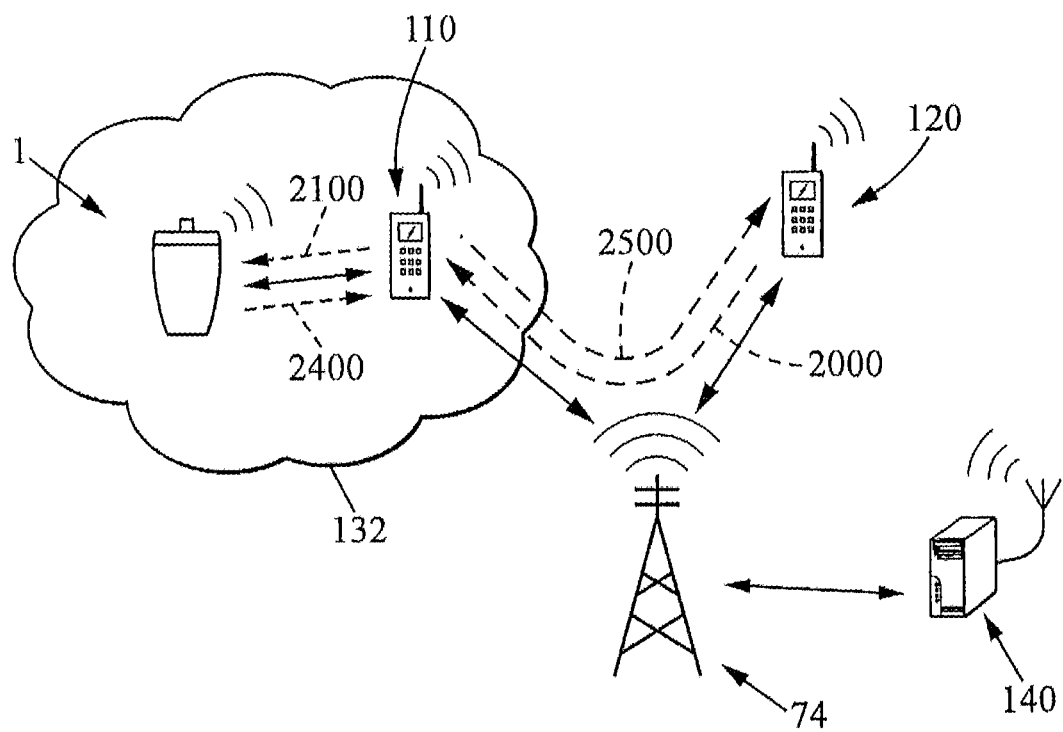
FIG. 8 is a schematic representation of a communication system according to an embodiment of the invention.

As illustrated in FIG. 8, the communication system according to the invention comprises:
- a container 1 for a cosmetic or pharmaceutical product or a wine or a spirit, and
- at least two mobile telecommunication devices, such as the two mobile telecommunication devices 110, 120.

Figure 9:
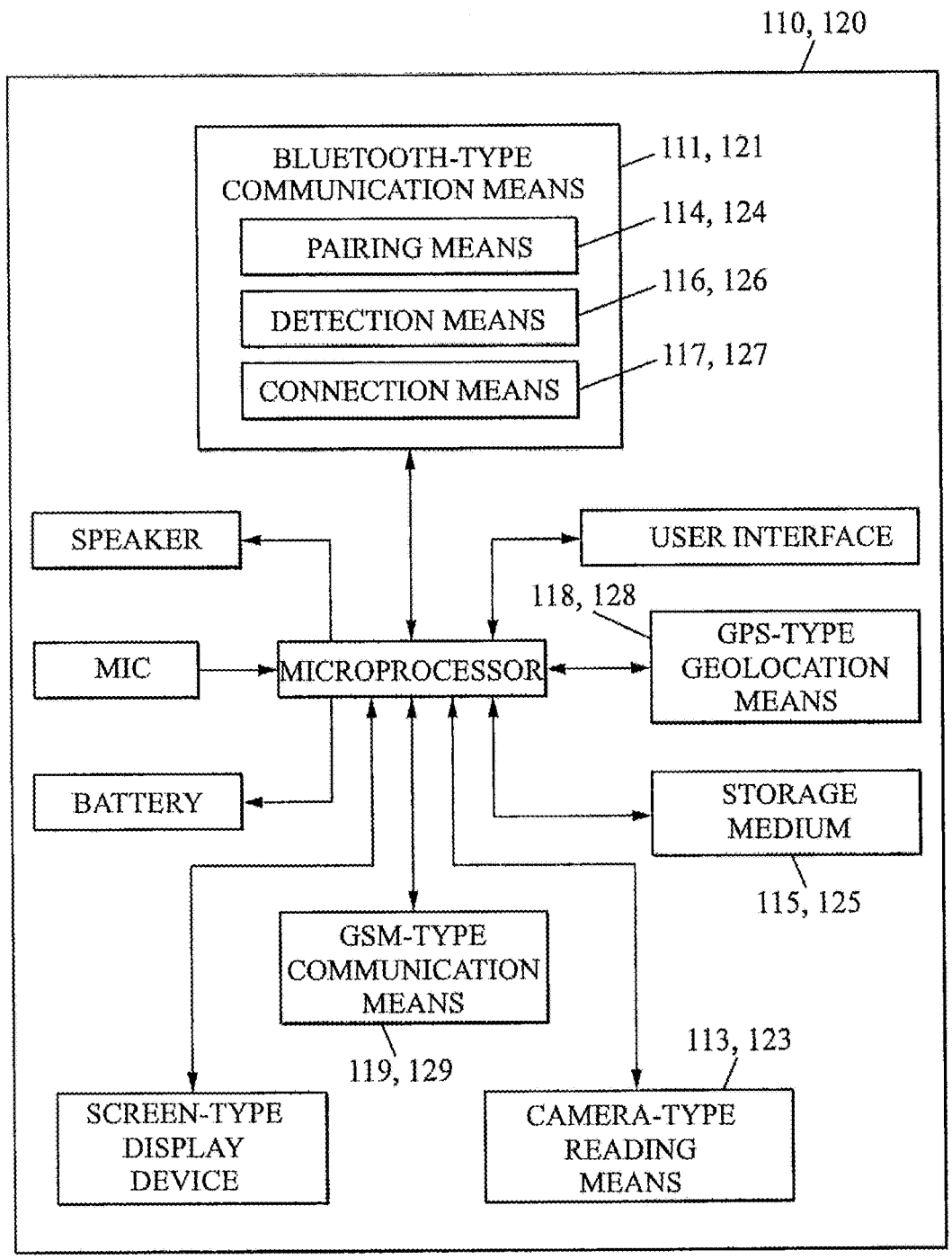
FIG. 9 is a block diagram of one of the mobile telecommunication devices of the communication system according to an embodiment of the invention, FIGS. 10 and 11 each represent a flowchart of the initialization of the communication system according to one embodiment of the communication method according to the invention.

As illustrated in FIG. 9, each mobile telecommunication device can consist of an existing standard terminal in widespread use, such as a smartphone or a tablet. It may comprise a microprocessor operatively connected to a plurality of electronic components including at least one among a battery, a user interface, a display device, a storage medium, and long-range radio communication means. The mobile telecommunication devices 110, 120 of the system are adapted to communicate with each other through their standard communication means 119, 129 via communication networks such as GSM, UMTS, or the Internet, through which it is possible to use the computational power and/or storage of remote systems (cloud computing).

The container 1 comprises a plurality of operatively interconnected electronic components, including:
- at least one source of sensory stimulation 7 arranged to emit at least one sensory signal towards the exterior of the container,
- two-way short-range radio communication means 131, and
- means 16 for controlling said at least one source of sensory stimulation.

"Sensory stimulation" is understood to mean attracting the interest of a user by tantalizing one of the senses, such as touch, smell, taste, and particularly sight or hearing. A "sensory signal" is understood to mean a signal that tantalizes one of the senses of the user. Hereinafter, mainly by way of example, we consider a light source as the source of sensory stimulation 7 and a light signal or a light sequence as the sensory signal or sequence of sensory signals. However, the communication system is not limited to this embodiment; for example, the source of sensory stimulation can be a loudspeaker and the sensory signal can be an audio signal.

At least a first mobile telecommunication device 110, the "first mobile phone" in the following, comprises two-way short-range radio communication means 111. Such communication means comprise at least one antenna, for example an antenna known as the "Compact Reach Xtend™ Chip Antenna for BLUETOOTH® and 802.11b/g WLAN."

The two-way short-range radio communication means 131 of the container 1 comprise at least one antenna, for example an antenna known as the "Compact Reach Xtend™ Chip Antenna for Bluetooth® and 802.11b/g WLAN."

In this manner, the container is able to communicate with a second mobile phone 120 and/or a remote computer server, for example the server of a brand and/or a community, by means of the first mobile phone 110 when the first mobile phone is located within a coverage area 132 of the communication means of the container 1.

Specifically, the control means 16 of the container control the light source or sources 7 to generate a light sequence, determined for example on the basis of data provided to the container, via the first mobile phone 110, by the second mobile telecommunication device 120, the "second mobile phone" below, and/or a remote computer server, for example the server of a brand and/or a community.

"Light sequence" means a set of commands for the emission of light by one or more LEDs, an emission which may last for a period of time, with or without periodic pulsing, the LEDs being treated the same or differently, the intensity being fixed or changeable over time, etc. For example, the microprocessor may command a light sequence in a spontaneous, periodic, and/or random manner.

The container 1 is more particularly described below with reference to FIGS. 1 to 7.

Figure 1:
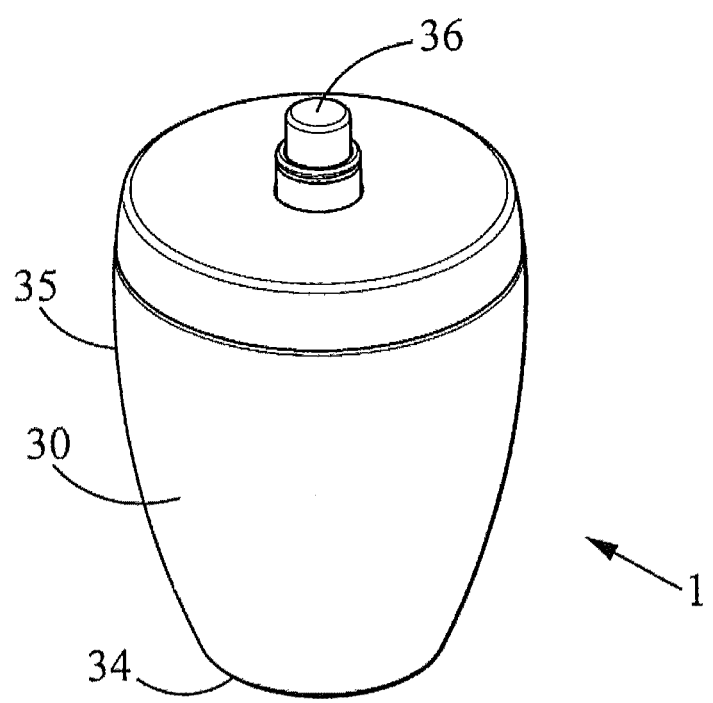
FIG. 1 is a schematic perspective front view of a container.

FIG. 1 schematically represents the container 1. It may comprise a base portion 34 enabling its stable placement on a support. As an illustration, let us assume a horizontal support defining an XY plane. The Z direction, normal to the XY plane, completes the XYZ trihedron. In the example shown, the outer surface of the container 1 is rotationally symmetrical about axis Z. This means that the X and Y directions are undifferentiated at the outer surface. This could be otherwise, however.

The container 1 extends, along the Z axis, from the base portion 34 toward an opposite head portion 35. In the example shown, the container 1 has an outer surface 30 whose shape flares slightly outward from the base portion 34 in the direction of the head portion 35. This could be otherwise, however. The head portion 35 comprises a dispensing member 36. In the example shown, the dispensing member 36 is the only means by which a user of the container can access the contents of the container 1. The dispensing member 36 comprises for example a pump.

The contents of the container may be cosmetic. For example, it is a perfume. Although the invention is presented with reference to the example of a perfume bottle, the invention could be applied to other types of containers, contents, and means for dispensing the contents. The contents of the container may for example be a pharmaceutical product, a cosmetic product such as skin cream or serum or liquid foundation, or a food product such as beverages, in particular soft drinks, beer, wine, champagne, alcohols, spirits, etc., particularly premium wines and spirits.

Figure 13:
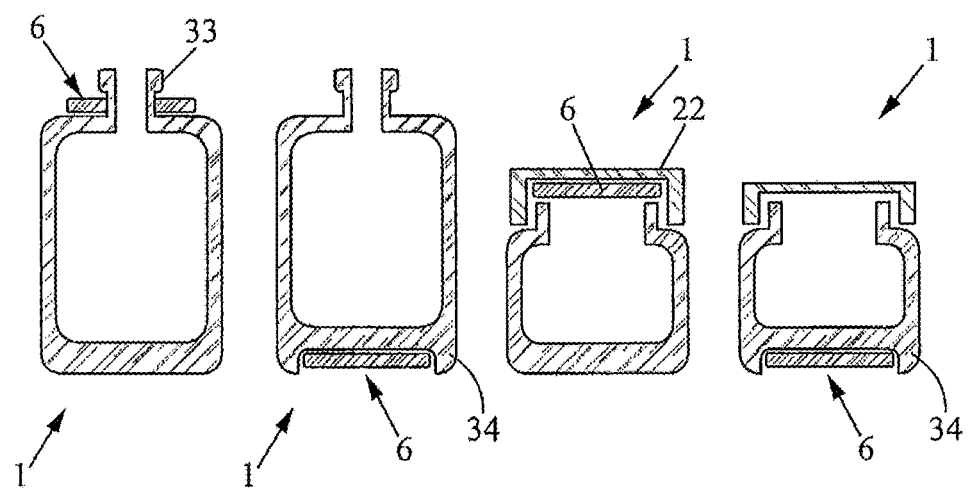
FIG. 13 shows sectional views of the container according to several embodiments of the invention.

As illustrated in FIG. 13, the printed circuit board 6 is not necessarily arranged around the neck 33 of the container, but could be arranged in the base 34 of said container or in any other suitable location of the container (for example hidden behind a decorative plate or label provided on the container). In addition, the container is not necessarily a perfume container provided with a pump arranged on a relatively narrow neck, but could also consist of a pot, for example of skin care cream, provided with a wide neck; in this case, the printed circuit board 6 can be arranged in a lid 22 of the pot or in the base 34 of the pot or inside the pot.

Figure 2:
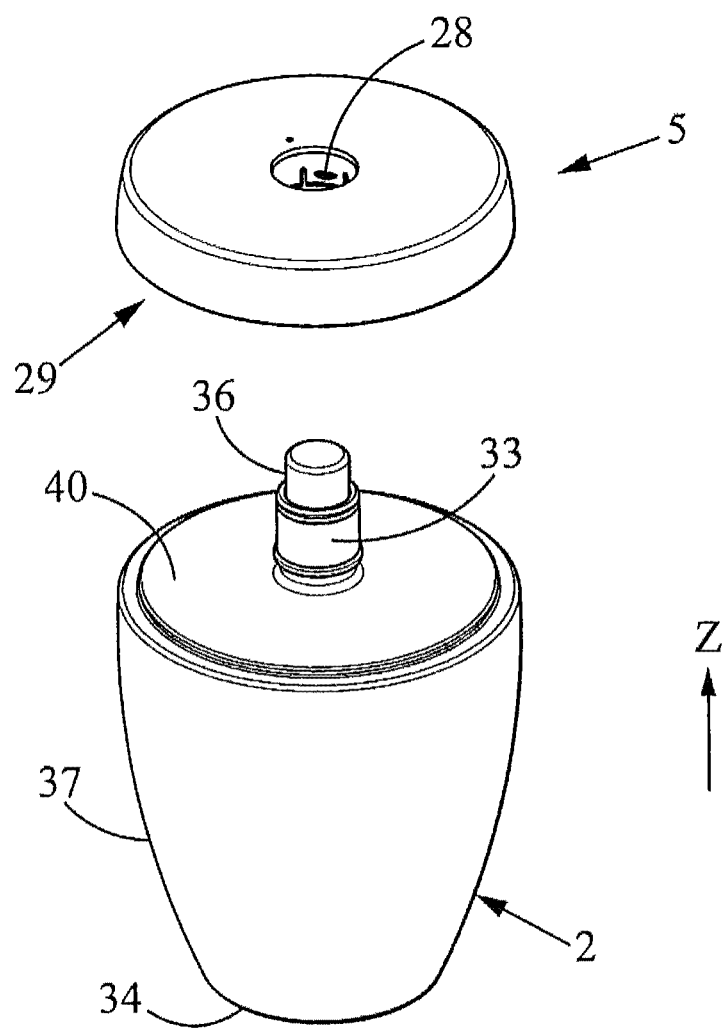
FIG. 2 is an exploded view from the same perspective as FIG. 1, of the container of FIG. 1.

As can be seen in FIG. 2, the container 1 is made of two components assembled together. In the present example, the two components are assembled together permanently. During normal use of the container, the two components are therefore not intended to be separated from one another. "Permanently" is understood to mean during normal use of the container, because of course one cannot prevent a user from detaching the two components from one another if every effort is made to do so. This falls beyond the normal use of the container, however. Note that it may be desirable, in order to comply with regulations in certain countries, to be able to disassemble the container for recycling at the end of its life, particularly if it includes at least one power source, such as a button cell battery for example. This disassembly involves detaching the two components that were assembled together to form the container 1. This disassembly may require the user to make use of a standard tool such as a screwdriver or knife for example, and an appropriate method which would be specified in the product instructions. Such disassembly may require a notch for inserting the tool between the two components.

As can be seen in FIG. 2, a first component is a receptacle 2. The receptacle is sealed and contains the cosmetic or pharmaceutical product or wine or spirit. The receptacle comprises a body 37 to which the dispensing member 36 is assembled in a sealed manner. The body 37 comprises the base portion 34 and a body portion extending from the base portion 34. The body portion comprises one or more peripheral walls (depending on the desired shape of the container 1) and a top wall 40. A neck 33 is formed in one of these two walls, in particular in the top wall 40. The dispensing member 36 is assembled on the neck 33 in a sealed manner.

Figure 7:
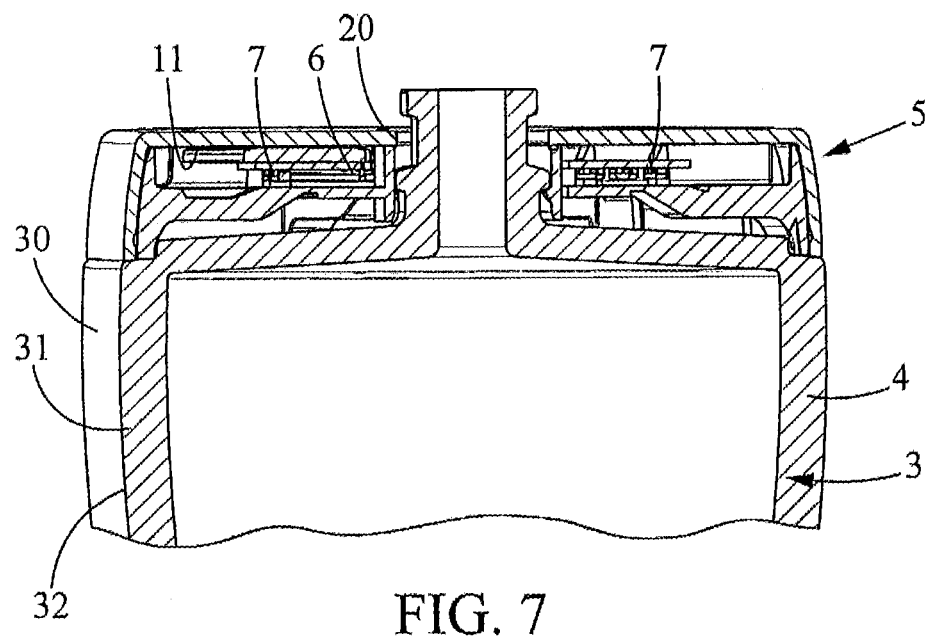
FIG. 7 is a vertical sectional front view of the container of FIG. 1.

The body 37 is made for example of glass or plastic. A material is chosen that is suitable for the application. The body 37 can thus have an outer wall 3 as can be seen in FIG. 7. The body 37 may also present a decoration intended to form a luminous effect. The decoration is provided on the outer surface 30 of the body 37, for example on the outer surface of the peripheral wall of the body 37. Such decoration can be achieved by providing an opaque region 31 and a translucent region 32 in the outer surface 30 of the body 37. The opaque region 31 may for example be achieved by providing an opaque material in the outer surface of the body 37 by a suitable technique. One may also provide an opaque region inside the receptacle 2. For example, an opaque material is provided on an inner face of the body 37. The opaque material is then compatible with the contents of the receptacle.

As illustrated in FIG. 2, the second component 29 comprises a housing 5 defining the outer volume of the second component 29. In the present exemplary embodiment of a container with a neck, the component 29 may comprise an annular shape provided with an opening 28 of axis Z, for example central. The central opening 28 is sized to allow passage of the neck 33. The housing 5 has a shape complementary to the receptacle 2. In particular, the peripheral wall or walls of the housing 5 have a shape corresponding to that of the receptacle 2 and may be thin. "Housing" does not necessarily mean a fully closed product. Some openings are possible. In the case where one face of the housing is directly opposite a face of the receptacle, this face may for example have openings.

Figure 3:
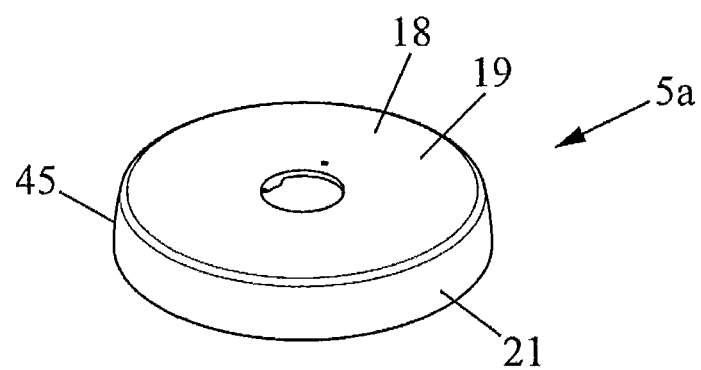
FIG. 3 is an exploded view from the same perspective as FIG. 1, of the housing of the container of FIG. 2.
Figure 3:
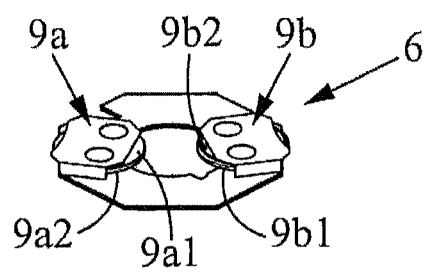
Figure 3:
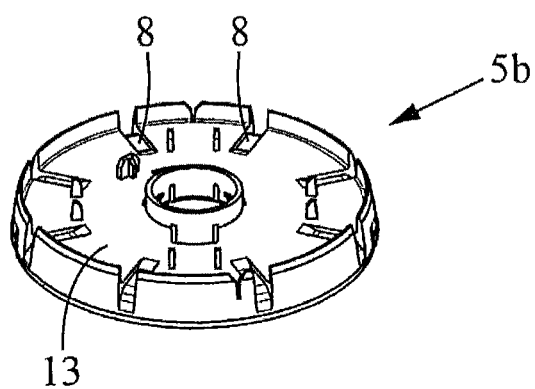
Figure 4:
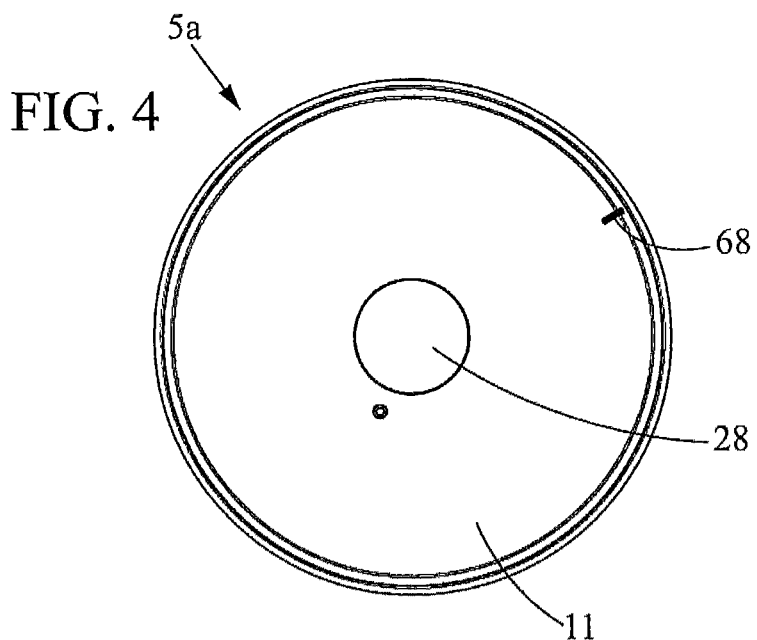
FIG. 4 is a bottom view of the top part of the housing.

The component 29 of this embodiment will now be described in more detail, with reference to FIG. 3.

The housing 5 may comprise a top part 5a and a bottom part 5b which can be assembled together to create a closed housing. In particular, the housing 5 may be fluidtight. "Fluidtight" is understood to mean a degree of sealing that preserves the integrity and proper functioning of the internal components of the housing during normal use of the housing. Normal use of the housing can include its prolonged presence in a damp room, in particular a bathroom. In particular, the bottom and top parts 5b, 5a are assembled by force or by gluing. Together they define an internal volume V.

The internal volume V contains a printed circuit board 6 and at least one (in this example two) power source 9a, 9b. The number of power sources depends on the energy to be supplied and the internal volume V. The power sources are button cell batteries for example, which have a suitable footprint and energy supply.

Figure 6:
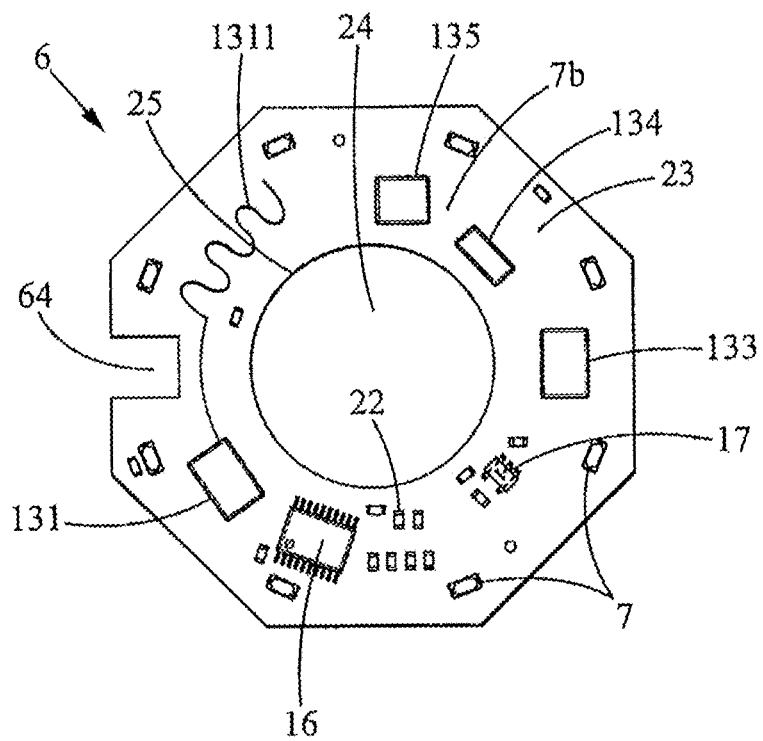

As represented in FIG. 6, the printed circuit board 6 comprises the communication means 131 of the container, including its antenna 1311, and the control means 16 for the light source or sources. The control means may comprise a microprocessor or microcontroller. The communication means 131 are for example of a type enabling implementation of the BLUETOOTH® communication standard. However, other types of communication means that are based on different communication protocols such as the ZigBee® and Wi-Fi® protocols can be used. The placement of the antenna on the printed circuit board requires that the housing parts 5a and 5b do not behave as a Faraday cage, which restricts the application of metal finishes on outer part 5a and/or of electrodes of a possible capacitive sensor. At least one should limit the size and position of surfaces rendered conductive, by distancing them from the antenna area.

In particular, the printed circuit board 6 is interposed, along axis Z, between the bottom part 5b and the top part 5a. The power sources 9a, 9b are for example inserted in housings suitable for this purpose and connected to the printed circuit board 6, in particular said housings may be soldered to the printed circuit board 6.

The top part 5a comprises a top plate from which extends a skirt 45. Part 5a has an inner face 11 and an opposite outer face 19. The outer face 19 is the visible main face of the housing. The bottom part 5b is arranged between the top part 5a and the receptacle 2. The top part 5a may be opaque. It may be implemented with an aesthetically appropriate external appearance, for example a varnish, metallization, and/or decorative patterns for example. Thus, the top part 5a completely hides the printed circuit board 6 and even the bottom part 5b from the view of a user external to the bottle. It is also possible fora portion of part 5b to be visible; this portion may be for example in the form of a translucent ring located at the interface with the container (at the base of the skirt of part 5a) or at the central opening 28 to form a ring around the neck.

According to one embodiment, the container 1 further comprises at least one sensor 17 arranged to detect an event such as manipulation of the container or some contextual information, for example a sudden change in the brightness around the container. The sensor is operatively connected to the other electronic components of the container. For example, it is at least partially supported by the printed circuit board 6. The sensor may be a simple switch located at the periphery of the housing 5. Alternatively, the sensor may operate as a sensing switch arranged to sense a change in capacitance between two electrodes, this change indicating an immediate presence or proximity or contact with something, which in most cases will be a user's finger. The sensor could also be an optical sensor capable of detecting whether the light in the room where the container is located, for example a bathroom, is on or off.

The sensor or sensors of the container (for example, inertial sensor for detecting motion, capacitive sensor for detecting proximity and/or contact, light sensor for detecting changes in the level of ambient light) can thus be intended to detect:
user actions,
personal characteristics of the user, for example the level of hydration of the skin, etc.
properties (or state changes) of the product contained in the container, for example the level of use, degree of expiration, degree of hydration, possible contamination, etc.

The sensor or sensors of the container can also be designed to send information about these actions or properties via the communication network, to the user of the second mobile telecommunication device (smartphone or tablet . . . ) and/or to the server of a brand or of a community.

In other alternatives, the sensor 17 can be a mechanical sensor arranged in association with the dispensing member 36 in order to sense its actuation, or an inertial sensor, for example an accelerometer, such as the one known as the "MMA8452Q 3-Axis 12/8-bit Digital Accelerometer", adapted to detect motion of the printed circuit board 6 (due to movement of the container carrying it).

Figure 5A:
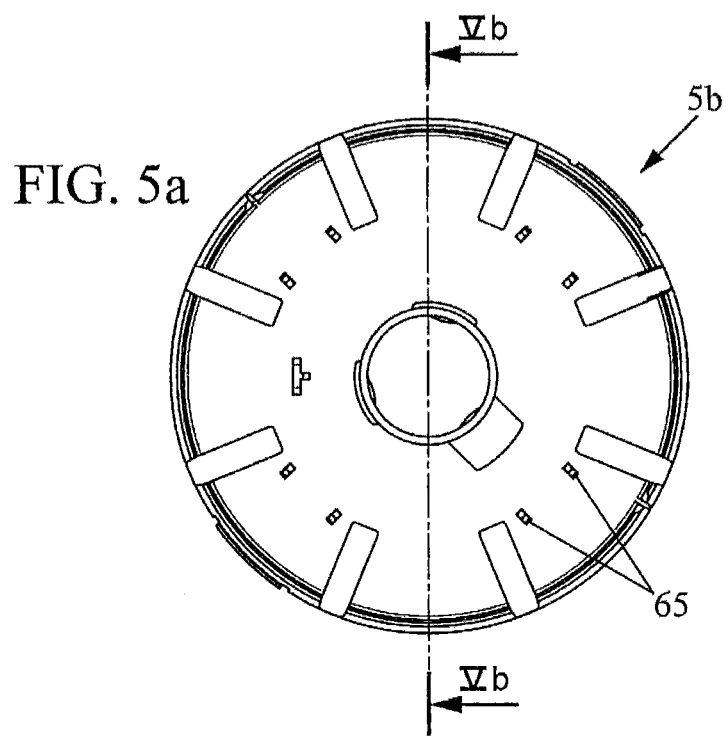
FIG. 5a is a top view of the bottom part of the housing.
Figure 5B:
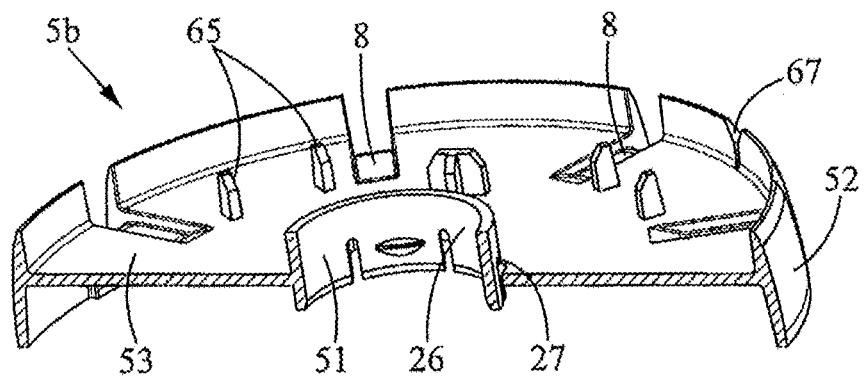
FIG. 5b is a sectional perspective view of the bottom part, along line Vb-Vb of FIG. 5a, FIG. 6 is a bottom view of an exemplary printed circuit board.

FIGS. 5a and 5b schematically represent the bottom part 5b according to one embodiment.

In this example, the bottom part 5b is substantially contained within the volume defined by the top part 5a. It comprises a shape complementary to the top part 5a. It comprises a radially inner annular flange 51, a radially outer annular flange 52, and a plate 53 extending between these two flanges.

The radially inner annular flange 51 comprises a radially inner surface and an opposite radially outer surface. The radially inner surface is adapted to cooperate with the neck 33 of the bottle. The housing 5 is thus mounted on the neck 33 of the bottle by this means. For example, a snap-fitting attachment is provided. Other embodiments are possible.

The radially outer annular flange 52 engages with the inner face 11 (see FIGS. 4 and 7) of the skirt 45 of the top part 5a.

The plate 53 comprises a number of the functions of the bottom part 5b. The plate 53 offers for example rotational indexing of the printed circuit board 6. For example, a lateral positioning (meaning in the XY plane) of the printed circuit board 6 is provided. For this, lateral positioning pins 65 may be provided. The lateral positioning pins 65 protrude vertically upward from the upper surface of the plate 53. A plurality are provided on the periphery of the plate 53. They are for example provided in pairs, each pair being associated with a straight edge of the printed circuit board 6. The lateral positioning pins 65 may also form abutments on the inner face 11 of the top part 5a, to define the relative position of the top part 5a and bottom part 5b along the Z axis. Other embodiments are possible for the abutment along the Z axis.

The plate 53 carries openings 8 in line with the placement of the LEDs on the printed circuit board in its assembled position, enabling transmission of the light from the LEDs toward the receptacle 2. FIG. 6 shows a printed circuit board 6 according to one embodiment, and in particular the bottom face of the printed circuit board. The printed circuit board comprises a thin substrate 23 and traces (not shown) electrically interconnecting the various electronic components. It can consist of a single-sided printed circuit board, double-sided, or multilayer.

The printed circuit board 6 has a form suitable for the application. In particular, in the present example it can have an annular shape with a central opening 24 sized for threading with some clearance onto the radially inner annular flange 51 of the bottom part 5b of the housing 5.

The printed circuit board 6 also has a notch 64 of a shape adapted to cooperate with a complementary projection from the bottom part 5b, for rotational indexing.

The printed circuit board 6 can have the shape of a hollow disk. Alternatively, the peripheral edge of the printed circuit board 6 can have a polygonal shape (excluding the notch 64). For example, an octagonal shape is chosen, as represented.

For example, the largest dimension along the outer periphery of the circuit board is between 3 cm and 6 cm, and the largest dimension along the inner periphery of the printed circuit board is between 1 cm and 3 cm.

As already introduced above, the printed circuit board 6 carries the microprocessor 16. The microprocessor 16 may be for example the microprocessor known as CC253X or CC2540. The microprocessor 16 may be preprogrammed to perform certain functions, as will be explained below. The printed circuit board 6 may carry the light sources 7. LEDs (for Light-Emitting Diodes) are chosen for example, such as RGB (red-green-blue) LEDs for providing color highlights with possibilities for significant variations. Additionally or alternatively, one can choose a display device, for example a digital display, an LCD screen (not shown), or organic LEDs (OLED for Organic Light-Emitting Diode) possibly forming a screen 7a. The display device may possibly be flexible in order to adapt to a container or a housing of complex shape (non-planar).

LEDs offer several advantages for the illumination of cosmetic bottles and jars. Their size is very small, which offers the ability to create light sources that are very localized or that form any desired shape by assembling multiple LEDs. They have very low power consumption (several ten of milliwatts) and are very efficient, therefore with very little heat loss, eliminating any risk of deformation of the component parts of the container 1 and in particular the housing 5, and any risk of deterioration of the product contained in the container 1. Many colors are available. They are easily mounted on a printed circuit board. They operate at extra-low voltage (ELV), which is a safety guarantee.

Each LED can be alternately in an active state in which it emits light, and in an inactive state in which it does not emit light. Each LED has an illumination spectrum specific to it, identical to or different from those of the other LEDs. The microprocessor 16 is programmed to control activation of the LEDs. Thus, the microprocessor can trigger the transition of LEDs from their inactive state to their active state, and vice versa.

The LEDs are arranged on the bottom face of the printed circuit board 6. It is arranged, for example, that the LEDs are placed as far as possible radially from the center of the printed circuit board 6. In particular, in the case of a polygonal printed circuit board, an LED is provided in each corner formed between two adjacent edges. The surface of the printed circuit board is thus optimized, and the central space is available for placement of the other electronic components.

Figure 14:
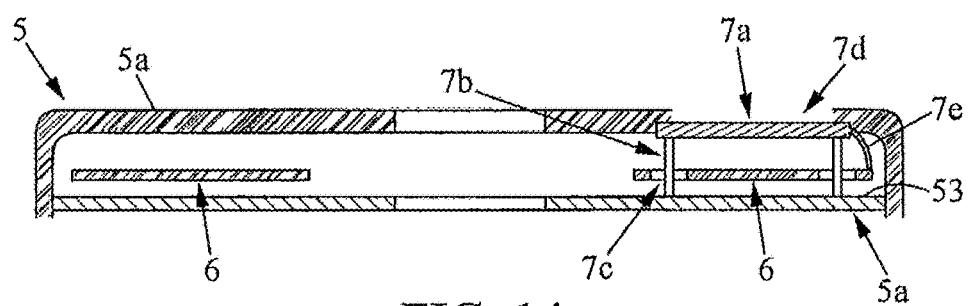
FIG. 14 shows a sectional view of a housing containing a printed circuit board and illustrates an exemplary arrangement of an OLED screen.

The screen 7a formed of organic LEDs may be arranged in the manner illustrated in FIG. 14. More particularly, the screen is supported by projections 7b extending from the printed circuit board 6. Alternatively, the projections 7b extend through the printed circuit board 7c via holes 7c formed in the printed circuit board for this purpose; more particularly, the projections 7b extend from the plate 53 of the bottom part 5b of the housing 5. The projections are dimensioned so as to press the screen 7a against an opening 7d made in the container 1, or a lid of the container, or more particularly in the top part 5a of the housing 5, so that the screen is visible when viewed externally to the container. It should be noted that the connector 7e between the screen 7a and the printed circuit board 6 is then advantageously short, and more particularly is a few millimeters long.

The microprocessor 16 can define for each light source 7, and particularly in a correlated manner for at least two light sources 7, or even all the light sources, one or more of the following characteristics, possibly variable over time:
  an illumination start time,
  an illumination end time,
  an illumination duration,
  an illumination intensity.

As already discussed above, the printed circuit board 6 also comprises the sensor 17. The sensor 17 is adapted to detect an event, such as manipulation of the container, and to transmit a corresponding signal to the microprocessor 16. The sensor 17 then transmits a suitable signal to the microprocessor which orders a light effect on this basis, possibly preprogrammed. The microprocessor 16 may also send information corresponding to the signal transmitted by the sensor 17, to one of the mobile phones and/or to the remote server via a telecommunications network 74.

Alternatively, the microprocessor 16 may receive a command from the outside. In particular, as represented in FIG. 8, the microprocessor may receive a command from a remote server 140 or from a mobile terminal 120 via a telecommunications network 74.

As represented in FIG. 6, the container 1 may comprise a timer 133. The timer 133 may for example comprise a quartz-based crystal oscillator operating in the megahertz or kilohertz range. The timer is operatively connected to the other electronic components of the container, and in particular to the microprocessor 16. The timer may be carried by the printed circuit board 6. The timer ensures the switching on or off of the light source or sources 7, for example in accordance with predefined data stored on a storage medium 135 of the container.

The timer 133 enables controlling the repetition of a light sequence at regular time intervals, until an event is detected. The timer also enables stopping the repetition of the controlled light sequence, after a certain time has passed without an event being detected. The absence of a detected event can then be interpreted as corresponding to the absence of the user for whom the light sequence is intended. Unnecessary power consumption is thus avoided. The timer also enables controlling the activation of the light source or sources at set time(s).

A timer 133 and a storage medium 135 are not essential in themselves, when the timer function can be fulfilled by a microprocessor clock 16 and there is sufficient storage capacity in the microprocessor 16.

The electronic components of the container 1 may be provided on one or the other of the faces of the thin substrate 23 and are electrically connected with the rest of the circuit by possibly plated through-holes.

FIG. 7 shows the assembled container.

The printed circuit board 6 is arranged on the bottom part 5b. The printed circuit board is arranged with its face carrying the LEDs turned toward the bottom part 5b. The orientation of the printed circuit board 6 around the Z axis is for example defined by the cooperation of the notch 64 and the complementary projection from the bottom part 5b to form a rotational indexing device. The external peripheral edge of the printed circuit board cooperates with the lateral positioning pins 65 of the bottom part 5b and the inner peripheral edge cooperates with the inner edge 25 of the printed circuit board threaded around the radially outer surface 27, to define the lateral positioning of the printed circuit board 6.

Next, the top part 5a is assembled to the bottom part 5b to close the housing 5 and define the internal volume V. The orientation of the top part 5a relative to the bottom part 5b is defined by a rotational indexing device. For example, the radially outer annular flange 52 comprises a slot 67 engaging with a rib 68 of the top part 5a. The housing 5 is closed for example by snap-fitting.

The housing 5 is then assembled to the receptacle 2, as explained above, to form a container 1. One can choose to assemble the dispensing member 36 to the neck 33 before or after assembly of the housing 5.

As explained above, in this embodiment there is no intention to recharge or replace the power sources. The electronic portion of the container 1 is therefore completely hidden from the user. The power sources and LEDs (number, consumption, brightness, threshold voltage) are then chosen so that the power sources are sufficient to supply the container for its presumed service life (based on the volume it holds, assuming it to be non-refillable). A low number of LEDs may cause parasitic bright spots, but will result in lower power consumption. Power consumption by the LEDs is obviously a factor in the type of light effects that can be offered (duration in particular), and in the life of the product. Maximum brightness may be useful for some light effects, but is not necessarily desired. The lowest threshold voltage can extend product life when the power sources only supply a low voltage. However, in some variants, a removable assembly of the top part to the bottom part may be provided in order to enable replacing the power sources, or a connector to a device for charging the power sources which are then rechargeable. Alternatively, a removable door may be provided to allow changing the batteries, which is particularly relevant for example in the case of an application with wines or spirits having a printed circuit board 6 positioned at the base of the container.

Figure 10:
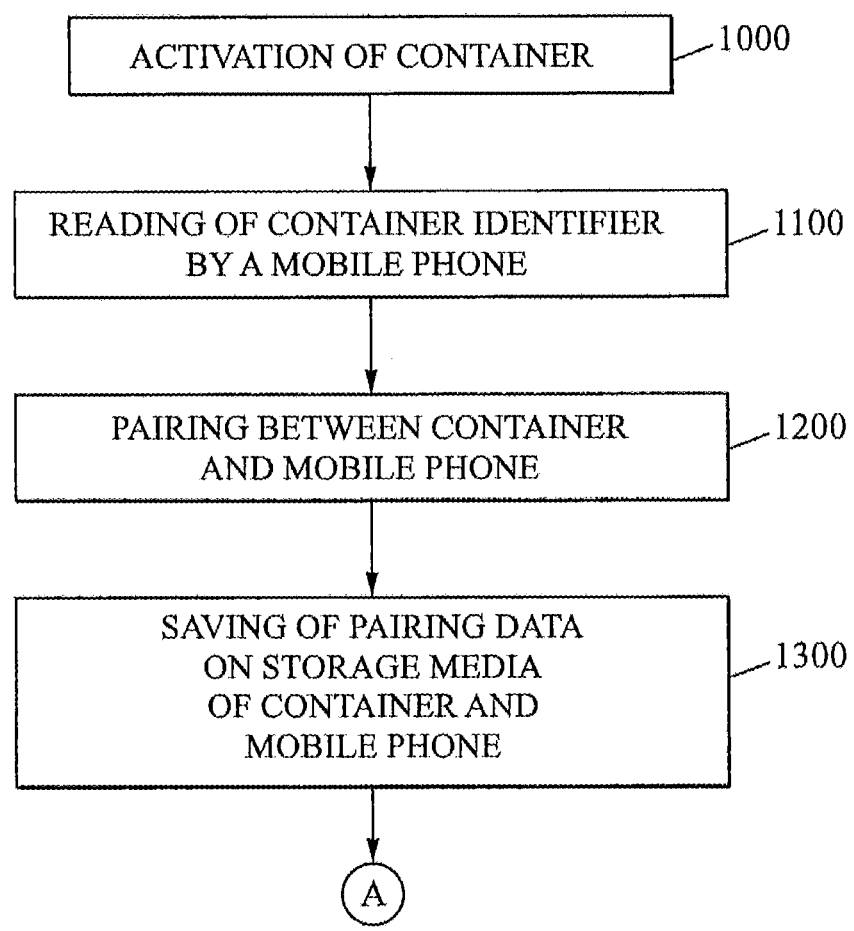

Activating the communication system and pairing the container and at least one of the two mobile phones will now be described, particularly with reference to FIG. 10.

The container may comprise an activation device (not shown). The activation device is adapted to alternate between a disabled state preventing at least the usage of the light sources 7, and an active state permitting at least the activation 1000 of the light sources 7. Such an activation device can advantageously prevent any power consumption before the user acquires the container 1. The packaged container will be moved about, so that a sensor 17, whether inertial or capacitive, could trigger the emission of light while the container is still packaged. The activation device is of particular interest in terms of saving energy, particularly when the power sources 9a, 9b are neither replaceable nor rechargeable.

The activation device can be at least partially carried by the printed circuit board 6. The activation device comprises for example a pushbutton switch actuated by a user to connect the power source 9a, 9b electrically to the electric circuit of the printed circuit board 6.

Alternatively, the activation device may comprise an activation tab. In its disabled state, the activation tab prevents for example any electrical contact between the power sources and the electric circuit of the printed circuit board 6. For example, the activation tab is made of an insulating material. A portion of the tab partially projects from the container through the housing 5, and an opposite portion is interposed between the power sources and the electric circuit of the printed circuit board 6. The user must pull on the projecting portion of the activation tab to disengage the activation tab from the container, placing the power sources 9a, 9b of the container in electrical contact with the other electronic components of the container via the traces of the printed circuit board 6.

Once the device is in its active state, one or more pre-programmed light sequences can be emitted. Many variants are possible.

The container may be associated with an identifier. The identifier is for example a tag such as a two-dimensional bar code or a "Bleam". It may be printed on the container, for example on the bottom surface of its base 34 or on the activation tab of the container. For example, the first mobile phone 110 comprises means 113 for reading this identifier.

The container and the first mobile phone comprise pairing means 124, 114, so that when the identifier 1100 is read, pairing 1200 between the container and the first mobile phone is triggered automatically. This pairing comprises a data exchange between the container and the first mobile phone. This data exchange allows defining pairing data that the container and the first mobile phone can store 1300 in their respective storage media 125, 115. If the identifier 1100 is read when the first mobile phone 110 is not within the coverage area 132 of the communication means 131 of the container, pairing 1200 can be placed in a task list of the first mobile phone that is to be implemented automatically when the first mobile phone is within the coverage area of the communication means of the container. The pairing data serves to allow future connections between the first mobile phone and the container.

Once the pairing is successfully completed, the container 1 emits for example a preprogrammed light sequence indicating a successful pairing.

The first mobile phone 110 may comprise means 116 for detecting the presence of the container 1 within the coverage area of its short-range communication means 111, or vice versa. Specifically, the mobile phone polls its environment, for example at regular intervals, by sending short-range radio messages announcing its presence. Continuously or at certain times of day (in a manner controlled for example by the timer 133), the container enters a listening mode for such polling messages and upon receiving such a message it responds by signalling its presence to the first mobile phone. Variants which use the container in sleep mode for example are also possible. More particularly, when the container is in sleep mode, most of its functions are temporarily disabled in order to reduce power consumption. The container may enter sleep mode after a predefined period of inactivity, for example the absence of any event detection by the sensor 17 during a period of time. More particularly, during pairing, the first mobile phone and the container may have concluded their attempt to detect one another by sending a message signaling their presence and by listening for such a message, during a given period of activity, for example a few seconds, defined at given time intervals, for example 2 to 3 minutes. Thus, during a period of time equal to a time interval from which is subtracted the period of activity, most functions of the container can be inactive, particularly its listening function, because it is known that no activity is planned during this time. This synchronization thus saves the energy resources of the first mobile phone and particularly of the container whether they are the one polling for the presence of the other or the one receiving the polling message.

Figure 11:
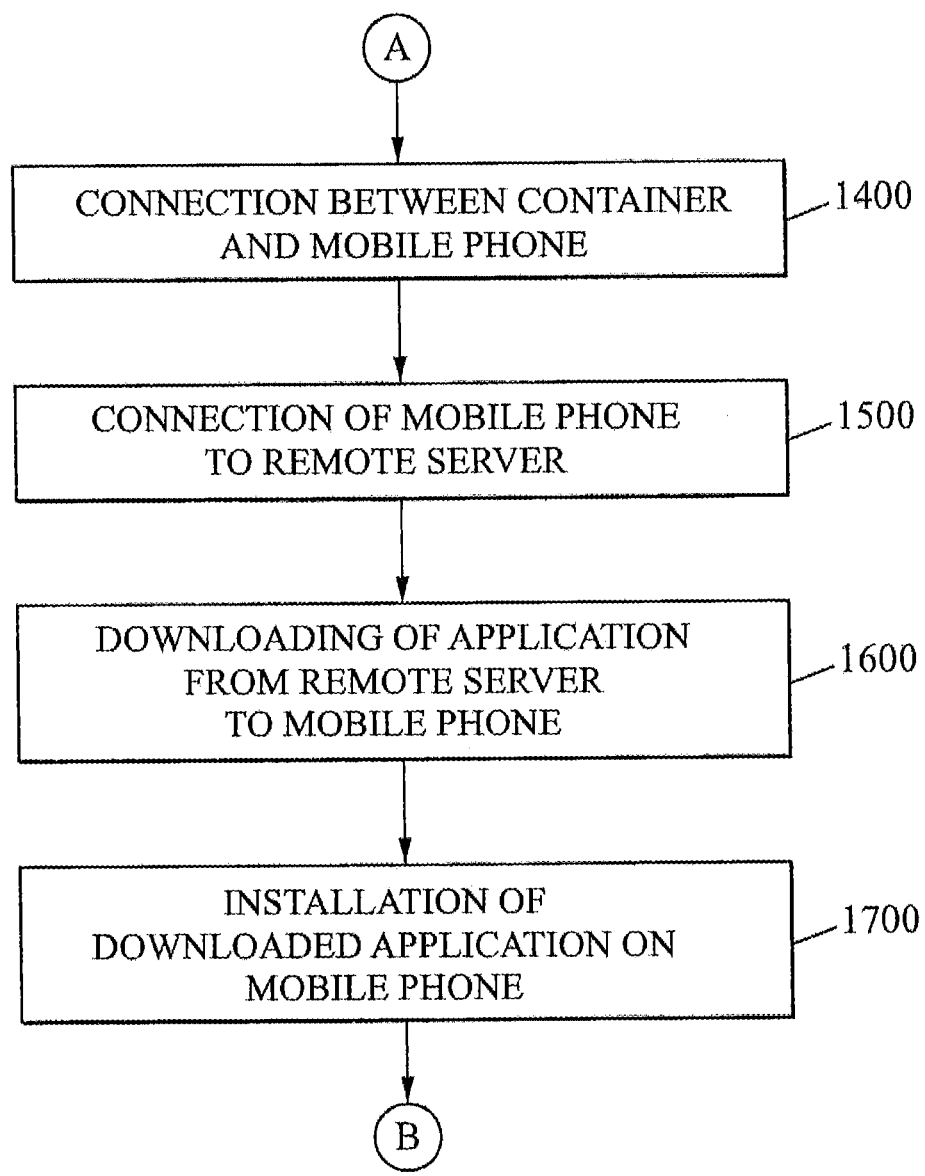

Initialization of future communications between the container and at least one of the two mobile phones will now be described in particular with reference to FIG. 11.

Via automatic connection means 117, the first mobile phone 110 and the container 1 are ready to connect to each other 1400 using the pairing data stored on their respective storage media 115, 135. This connection may be automatic, or connection permission may be automatically requested of the user by the first mobile phone 110. The connection 1400 comprises a synchronization between the communication means 111, 131 of the first mobile phone 110 and the container 1. This synchronization enables the correct interpretation of commands sent by the first mobile phone to the container, and vice versa, during a subsequent communication session.

The first connection 1400 of the first mobile phone 110 and the container 1 can trigger the connection 1500 of said mobile phone to a remote server 140 of the communication system. For this purpose, the login information for the remote server may have been stored in the microprocessor 16 of the container and automatically communicated to the mobile phone 110, for example at first connection. Alternatively, the connection data for the remote server may be encoded in the two-dimensional bar code identifying the container, and are then decoded by the mobile phone after reading 1100 the identifier.

On the remote server 140, there are dedicated applications for interfacing the various communicating devices of the system. For example, a web page opens on the first mobile phone 110 to offer a plurality of applications to download.

Many types of applications may be provided. In particular, a first application may be dedicated for download and installation on the first mobile phone, and a second application may be dedicated for download and installation on the second mobile phone. The first and second mobile phones do not necessarily play the same role in the communication system of the invention. The second mobile phone is essentially adapted to communicate with the container, while the first mobile phone essentially acts as a communication gateway between the container and the second mobile phone. When the roles of the first and second mobile phones in the communication system according to the invention are essentially asymmetric, it is advantageous to provide different applications.

As illustrated in FIG. 9, the second mobile phone 120 may comprise means equivalent to those of the first mobile phone 110. The second mobile phone 120 may comprise shortwave radio communication means 121, means 123 for reading the identifier of the container, means 126 for detecting the container and means 127 for automatically connecting to the container. Thus, the second mobile phone can implement the same communication steps as the first mobile phone, for example even connecting to the remote server 140. Other ways of informing the second mobile phone 120 of the connection data for the remote server 140 are also possible. For example, these data may be transmitted by the first mobile phone 110 to the second mobile phone 120 via standard wireless communication.

Once the mobile phone 110, 120 is connected 1500 to the remote server, one or more applications can be downloaded 1600 and installed 1700 on the mobile phone 110, 120.

Each application can help define a personal database comprising data such as preferences for using the communication system according to the invention. For example, calendar data or data for connecting to a social networking account may be provided. These data allow the application to provide the user with reminders of calendar events, shortcuts for sharing communications exchanged via the communication system of the invention with contacts of the social network, etc.

The application also allows defining a lookup table, mapping between data communicated from the second mobile phone 120 and a light sequence to generate.

Generally, the lookup table comprises input data and output data and maps the input data to the output data. For example, the user of the second mobile phone 120 can use the application to define a correspondence between input data comprising a sequence of alphanumeric characters or an icon that the user has specified or selected from a proposed set of strings of alphanumeric characters or icons, and output data corresponding to a light sequence that the user has defined or has selected from a proposed set of light sequences. Alternatively, the input data can be determined on the basis of data communicated from the second mobile phone 120, for example on the basis of the type, the weight (in bytes), the length (in characters) of these communicated data.

The data and the lookup table indicated by each user via his or her mobile phone can be stored on the remote server 140 and/or in the storage medium 115, 125 of the user's mobile phone 110, 120 and/or on the other mobile phone and/or in the "cloud".

Figure 12:
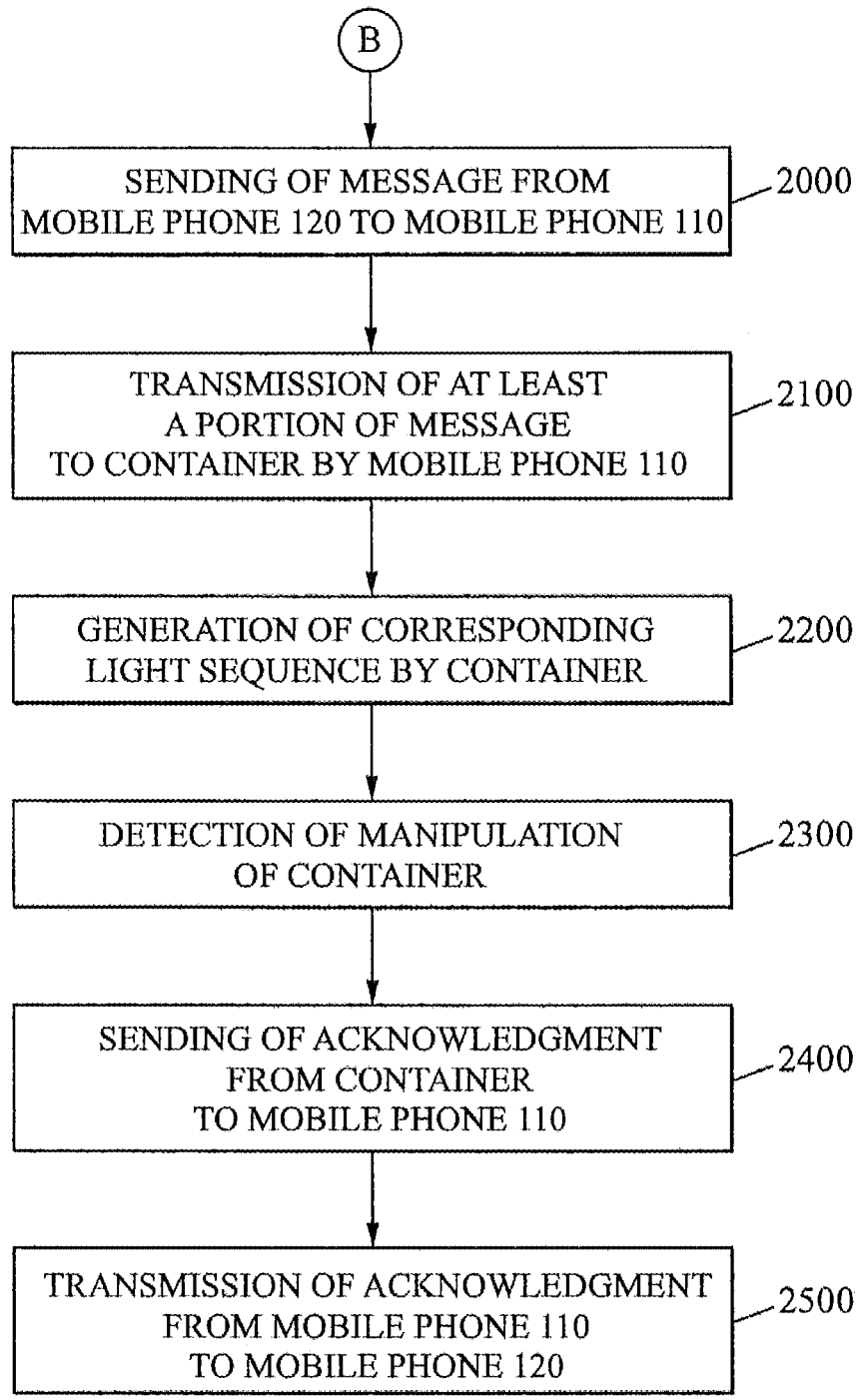
FIG. 12 represents a flowchart of the communication method according to one embodiment of the invention.

An embodiment of the communication method according to the invention will now be described with reference to FIGS. 8 and 12.

The user of the second mobile phone 120 opens his application. For example, opening the application causes the display of a graphical interface, provided by the installed application, on the screen of the second mobile phone, enabling visual and interactive communication with the user. The graphical interface may more particularly comprise a screen background, for example a photograph of the users of the first and second mobile phones, an indication of the name of the city and the local time at the location of each of the users of the first and second mobile phones, and a plurality of interactive software components. Each interactive software component may enable obtaining and possibly modifying information relating to past or possible communications via the communication system. For example, a first interactive software component provides predefined message information, a second interactive software component provides information on messages received and read, a third interactive software component provides information on messages received and unread, and a fourth interactive software component provides and allows modifying the data in his personal database. The user of the second mobile phone 120 can thus select a sequence of alphanumeric characters or an icon. This selection is achieved for example by touching the mobile phone screen. This selection can trigger the display of menus, menu bars, or submenus. For example, selecting the first interactive software component triggers the display of a menu bar and of a menu corresponding to a first selectable component of the menu bar. The menu may comprise a plurality of new interactive software components, each taking for example the form of an icon and emitting a corresponding message upon selection, via the communication system. For example, selecting the second interactive software component triggers the display of previously received icons in a particular configuration: as an example, the icon for the most recent message is located essentially in the center of this display and the icons corresponding to the ten previously received messages are distributed in this display around the icon corresponding to the most recent message, the icons for the oldest messages being displayed smaller than the icons for the most recent messages.

For the selection made, the lookup table contains at least the corresponding control data for a light sequence.

A message is sent 2000 to the first mobile phone 110, which includes data corresponding to the selection made and/or the control data for the light sequence corresponding to the selection made, depending on whether or not the lookup table is stored on the second mobile phone.

If the lookup table is only stored on the remote server 140, the data corresponding to the selection made is sent by the second mobile phone to the remote server, which looks in the lookup table for the control data for the light sequence corresponding to the selection made. The remote server sends said control data, and possibly transmits the data corresponding to the selection made, to the first mobile phone.

If the lookup table is stored only on the first mobile phone, the data corresponding to the selection made is sent by the second mobile phone to the first mobile phone, directly or through the remote server. The first mobile phone finds the control data for the light sequence corresponding to the selection made, via the lookup table.

In response to receiving this message, the first mobile phone 110 may possibly display on its display device the string of alphanumeric characters or the icon received. Also, in response to receiving the message, the first mobile phone 110 transmits 2100 the control data for the light sequence to the container 1, by short-range radio. Upon receipt of such data, the container generates 2200 the ordered light sequence. Generation of the light sequence may be dependent on contextual information. For example, when the container is located in a room such as a bathroom, the light sequence is only generated if the light sensor of the container detects that the room is not dark, or that there is light in the room. Characterizing the environment of the container or its variations by means of at least one sensor 17 of the container is therefore advantageously taken into account in assessing the relevance of emitting the ordered light sequence immediately or at a later time, on the basis of a corresponding presumption that the receiving party is present in the room where the container is located. If the receiving party is presumed to be absent from the room where the container is located, the first mobile phone can simply display on its display device the string of alphanumeric characters or the icon received, and possibly abandon the ordered light sequence.

If the first mobile phone 110 is not within the coverage area 132 of the communication means 131 of the container, or if the receiving party is presumed to be absent from the room where the container is located, the transmission 2100 can be placed in a task list of the first mobile phone, for automatic implementation when the first mobile phone comes within the coverage area of the communication means of the container.

Alternatively, the message sent by the second mobile phone 120 may comprise a photograph taken using a camera 123 of the second mobile phone. The message then also includes control data for a light sequence, determined via the lookup table as corresponding to a message including a photograph. The message is sent 2000 to the first mobile phone which may possibly display the photograph on its display device and which transmits 2100 the control data to the container. As a result, the container generates 2200 the ordered light sequence.

If the container 1 is manipulated within a certain period of time after the order was received or after the light sequence was generated, this manipulation is detected 2300 by the sensor 17 and an acknowledgment may be sent 2400 to the first mobile phone 110. The first mobile phone 110 transmits 2600 the acknowledgment to the second mobile phone 120.

Alternatively, upon receipt of the acknowledgment, the application installed on the first mobile phone may offer the user the ability to select a response from a plurality of messages that the user has previously defined or that are proposed by the application. The first mobile phone 110 sends the selected response message to the second mobile phone 120 as an acknowledgment. As an alternative to this variant, the response message may be determined based on the type of event possibly detected, may be determined randomly from a plurality of messages that the user has previously defined or that are proposed by the application, or may or be determined on the basis of the message sent by the second mobile phone.

For another example, the application installed on the first mobile phone may prompt the user to take a photograph using the camera 113 of the first mobile phone 110, in order to send said photograph to the second mobile phone 120 as an acknowledgment. This sending of the photograph is then independent of any connection between the first phone and the container, so that the photograph is not necessarily taken in the room where the container is located but could be taken anywhere, for example on the way to work.

Upon receipt, the response message may be displayed on a display device of the second mobile phone.

In another application, the light sequence may be based on a distance between the two mobile phones. At least the second mobile phone is then equipped with geolocation means 128. The container 1 may be kept at a constant location, for example specified in the personal database. The container 1 could also be transported, for example by the user of the first mobile phone 110. In this case, the first mobile phone also comprises geolocation means 118 so that the distance between the two mobile phones can be calculated. For example, the light sequence evolves from a light that is pale blue and/or slowly pulsing when the distance between the mobile phones is high, to a light that is bright red and/or rapidly pulsing when the distance between the two mobile phones is minimal. In this manner, by observing the container, the user of the first mobile phone knows that the user of the second mobile phone is approaching, and if desired can prepare for his arrival by using the perfume contained in the container.

The container of the invention is integrated into the communication system such that it adapts at least to the presence of the first mobile phone within its coverage area. The container may further be integrated into the communication system such that it responds at least to detected events. The container of the invention is thus advantageously an actor in the communication system. The container promotes the intelligent environment defined by the communication system according to the invention.

The communication system according to the invention makes it possible to send direct feedback concerning the use of the container, and therefore the consumption of its content, to the company that markets the container. In the past, such feedback was only possible via the distributors of the distribution channel and was therefore partial by definition. The company that markets the container of the invention thus has knowledge about its customer base, which enables it to track the success of existing products and to adapt future products.

Various embodiments have been detailed above. However, the invention is not limited to the embodiments described. For example, the container can be equipped with means of reproducing sound as an alternative or complement to the light sources, for generating a tune to complement or replace a light sequence. In another example, each time a manipulation of the container is detected and/or one of the proposed applications is opened, a message of potential activation of a communication session between the mobile phones is sent to the second mobile phone 120 via the first mobile phone 110, this session being activated for a relatively short time, a few tens of seconds, for example 20 seconds, to allow the user of the second mobile phone to send a message to the first mobile phone, said message thus being transmitted to the container while the user of first mobile phone is most probably in the vicinity of the container, and possibly while the container is in listening mode.

In another example, a detection of the first mobile phone by the container, or conversely of the container by the first mobile phone, can trigger the automatic transmission of a message from the first mobile phone to the second mobile phone when a certain period of time, for example several hours, has passed since a previous detection; in this manner, a user of the second mobile phone can be notified that the user of the first mobile phone has just returned from work and is able to receive a private message, for example sent by the second mobile phone. The communication system described above comprises two mobile phones, but it can comprise more mobile phones belonging to the same users or to different users.

The skilled person will understand that some of the technical features described above contribute, or can contribute, possibly at the cost of adapting the content and the container concerned, to an optimized management of the power reserves of the container. For example, the container may pass a variable amount of time, ranging from weeks to months, in the distribution channel traveled by the container to reach the user. This time may therefore be significant relative to the time the container is actually in utilization once placed in service. Hence the importance of limiting power consumption while the product is in the distribution chain. This utilization time is itself highly variable. As an illustration:

- the typical utilization time for a cosmetic product can range from about 3 to 6 months, or even longer for 'seasonal' care products (sunscreens only used in the summer, highly moisturizing products primarily used in the winter, etc.),
- conversely, the utilization time for a bottle of champagne is very short, about an hour,
- for a bottle of spirits such as cognac, the utilization time may be several years.

Any energy savings for the container are therefore useful in order to limit the size of the embedded power sources which by definition have a given service life or vice versa, given that, unlike a mobile terminal which can be periodically recharged, changing or recharging the power sources of the container in some of these embodiments is not provided.

It should be noted that the pairing means 114, 124, the detection means 116, 126, and the connection means 117, 127 of each mobile phone 110, 120 may be comprised in the short-range radio communication means 111, 121 of the mobile phone. Similarly, any of the above references to pairing means, detection means, or connection means of the container can be understood as references to the short-range radio communication means 131 of the container 1. In addition, the microprocessor 16 may be integrated into a short-range radio communication module, for example a BLUETOOTH module, for example known under the reference "CC2541 Bluetooth Smart SoC", possibly together with the pairing means, detection means, or connection means of the container 1.

The present invention also relates to a computer program comprising instructions for implementing the above method when said instructions are distributed across various storage media of the above communication system and executed by various processors of said communication system. It also relates to media (in particular non-transitory) storing such a program. The computer program may be written in different programming languages. In addition, the computer program may be based on applications and/or programming interfaces intended to facilitate development.

The invention claimed is:

1. A communication system, wherein the communication system comprises:
    a container for a cosmetic or pharmaceutical product or a wine or spirit, and
    at least two mobile telecommunication devices,
    wherein the container comprises a plurality of electronic components that are operatively interconnected, including:
    at least one source of sensory stimulation, arranged to emit a sensory signal towards the exterior of the container,
    two-way short-range radio communication means,
    control means for said at least one source of sensory stimulation, and wherein a first among said at least two mobile telecommunication devices comprises two-way short-range radio communication means,
    such that the container and a second among said at least two mobile telecommunication devices are able to communicate with each other via the first mobile telecommunication device, when the first mobile telecommunication device is located in a coverage area of the two-way communication means of the container,
    the control means of the container controlling said at least one source of sensory stimulation so as to generate a sensory signal sequence determined at least on the basis of data communicated to the container by the second among said at least two mobile telecommunication devices.

2. The communication system according to claim 1, wherein, as the container is associated with an identifier, and at least one among said at least two mobile telecommunication devices comprises means for reading this identifier, the container and said mobile telecommunication device comprise pairing means and data storage media, these means being arranged so that the reading of the container identifier by the reading means of said mobile telecommunication device initiates a pairing between the container and said mobile telecommunication device by their respective pairing means.

3. The communication system according to claim 1, wherein the first mobile telecommunication device comprises:
    means for detecting the presence of the container within the coverage area of its short-range communication means, and
    means for automatic connection with the container by using at least predefined pairing data stored in a storage medium of the first mobile telecommunication device, such that, a communication session is opened between the first mobile telecommunication device and the container, via their respective short-range communication means.

4. The communication system according to claim 1, further comprising a remote server with which at least one among said mobile telecommunication devices is able to communicate at least in order to download an application to install, this application being dedicated to defining and storing, at least on a storage medium of the mobile telecommunication device and/or of the remote server, at least one among:
    a personal database, and
    a lookup table mapping between the data communicated to the container and the light sequence to generate.

5. The communication system according to claim 1, wherein the container further comprises at least one sensor arranged to detect an event, the sensor being operatively connected to the other electronic components of the container so that detection of the event by the sensor then triggers, a sending of corresponding data by the communication means of the container to the second mobile telecommunication device or a remote server.

6. The communication system according to claim 1, wherein the container further comprises a timer operatively connected to the other electronic components of the container in order to ensure the activation or deactivation of said at least one source of sensory stimulation at least on the basis of predefined data stored in a storage medium of the container or of the first mobile telecommunication device.

7. The communication system according to claim 1, further comprising means for the geolocation of one of said mobile telecommunication devices, so that the sensory stimulation sequence is generated, at least on the basis of corresponding geolocation data.

\* \* \* \* \*